United States Patent [19]
Poteet

[11] 3,759,642
[45] Sept. 18, 1973

[54] EXTRUSION CUTTING DEVICE

[75] Inventor: Charles S. Poteet, III, Cockeysville, Md.

[73] Assignee: W. R. Grace & Co., New York, N.Y.

[22] Filed: Oct. 26, 1971

[21] Appl. No.: 192,167

[52] U.S. Cl..................... 425/72, 83/177, 425/289
[51] Int. Cl......................... B26f 3/00, B29c 17/14
[58] Field of Search ............... 83/177, 53; 239/515; 425/310, 314, 72, 289

[56] References Cited
UNITED STATES PATENTS

| | | | |
|---|---|---|---|
| 1,091,663 | 3/1914 | Killam | 239/515 X |
| 2,814,338 | 11/1957 | Ryden | 239/515 X |
| 2,895,682 | 7/1959 | Tavone | 239/515 X |
| 1,733,754 | 10/1929 | Reddemann | 239/515 X |
| 3,403,712 | 10/1968 | Westling | 83/177 X |
| 1,747,087 | 2/1930 | Schmalz | 83/177 |
| 814,774 | 3/1906 | Dixon et al. | 83/177 |

Primary Examiner—J. M. Meister
Attorney—Michael J. McGreal, et al.

[57] ABSTRACT

The device of this invention cuts multiple extrudates to a constant length while at the same time preventing any bending and resulting weakening of the extrudates. These extrusions are cut by a gaseous pressure source by directing this gaseous pressure in the area of the extruder die face. When the extrusion is of a preprogrammed length, the gaseous force on the extrudate will be sufficient to shear the material at the die face. An essentially opposing gaseous pressure force may be used in conjunction with the basic gaseous shearing structure. Inorganic extrudates are very effectively sheared using this device.

10 Claims, 4 Drawing Figures

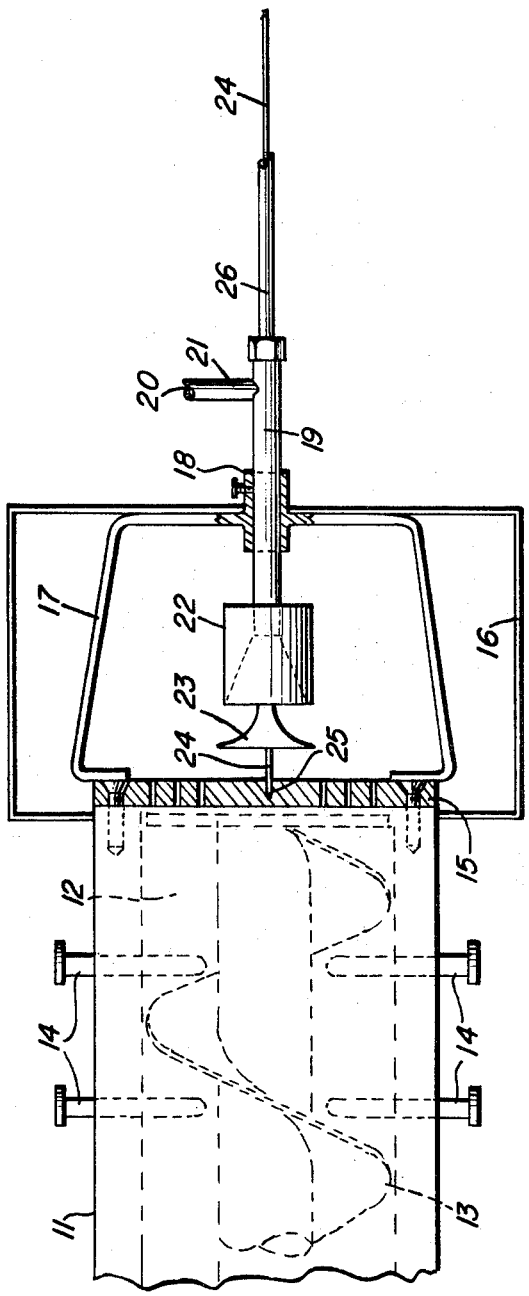
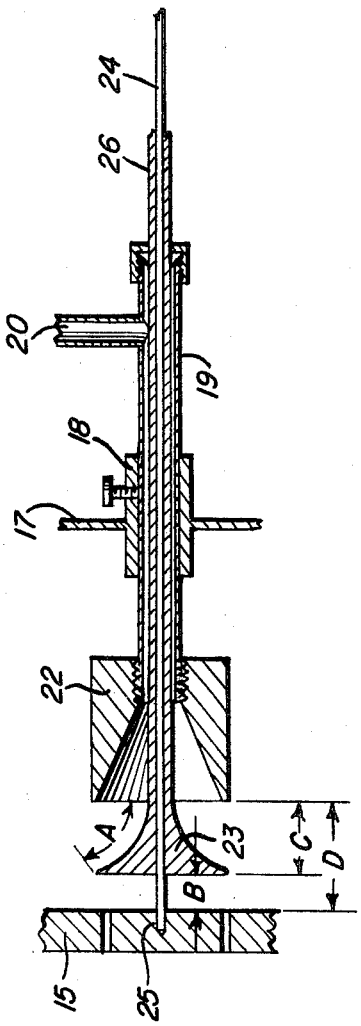

EXTRUSION CUTTING DEVICE

This invention relates to a device for shearing extrudates at an extrusion die face. In particular, it relates to a gaseous pressure device for shearing multiple extrudates so that they will be of an essentially constant length.

Gaseous streams have been used to cut various materials. In the glassmaking art, gas streams have been used to form the glass gobs prior to the blowing and shaping of the glass. U. S. Pat. Nos. 2,963,821 and 1,747,087 are illustrative of this use. These devices, are, however, different from that of the present invention. The use of a gas stream for cutting in combination with a die is disclosed in U. S. Pat. No. 3,505,963. This patent discloses a device for cutting a pasty material within the die face. This device requires a quite elaborate die so that a high pressure gaseous stream can be brought to each of a multiple number of extrudates.

The device of the present invention is a distinct improvement over devices known in the art in regard to both simplicity, versatility and effectiveness. The device of this invention is readily adjustable so that various length extrudates can be formed, and further, since not an integral part of the die face can be used on an extruder in conjunction with many dies so that a wide range of extrudate shapes and dimensions can be produced. This produces a very versatile extrusion machine, since with a simple change of the die, extrusions of a different shape or dimension can be produced and readily sheared.

Other advantages of the shearing devices of this invention are that it also simultaneously cools the die face and extrusions and unexpectedly removes surface water from the extrusions. This benefit of cooling the die face precludes the necessity of building cooling coils into or around the die face. And the unexpected drying of the extrusions has allowed them to be collected in a hopper without any fear of the individual extrusions agglomerating into large masses.

These are just a few of the advantages of the device of the present invention over those presently known and being used. Other advantages will be apparent from the further description of the device. Also, since the device is versatile and simple, many advantages will become apparant to those in specific use technologies and those having special problems.

In brief summary, the device of this invention comprises an attachment to an extruder in the area of the extruder die face. This device is particularly adapted to an extruder having a die which constantly forms a multiple number of extrudates. The device basically consists of a nozzle which shapes an elevated pressure gaseous stream and a deflector which directs the shaped air stream across the die face. The nozzle and the deflector are each independently adjustable, one to the other, and each in regard to the die face. Auxiliary equipment consists of a gas manifold, nozzle and deflector, mounting and positioning means as well as a bracket attaching means for removably attaching the shearing device to the extruder. Optionally, the device may comprise nozzle means at the periphery of the die face so as to direct a contrary flow of shearing air. This device is very useful in shearing inorganic extrudates such as metal oxide and metal oxide mixture extrudates.

It is a prime object of this invention, therefore, to set out a simple, versatile and effective device for gas pressure shearing extrudates at a die face.

It is further a principal object to shear metal oxide or mixed metal oxide mixture extrudates so that they are essentially of a constant length.

It is also an object of this invention to shear extrudates in a manner such that no weakening bending forces occur in the extrudates prior to or during shearing.

Other objects and advantages of the invention will become apparent by reference to the following detailed specification and accompanying drawings, wherein:

FIG. 1 is an overhead of an extruder with the shearing device attached;

FIG. 2 is an overhead view of the shearing device;

Figure 4:
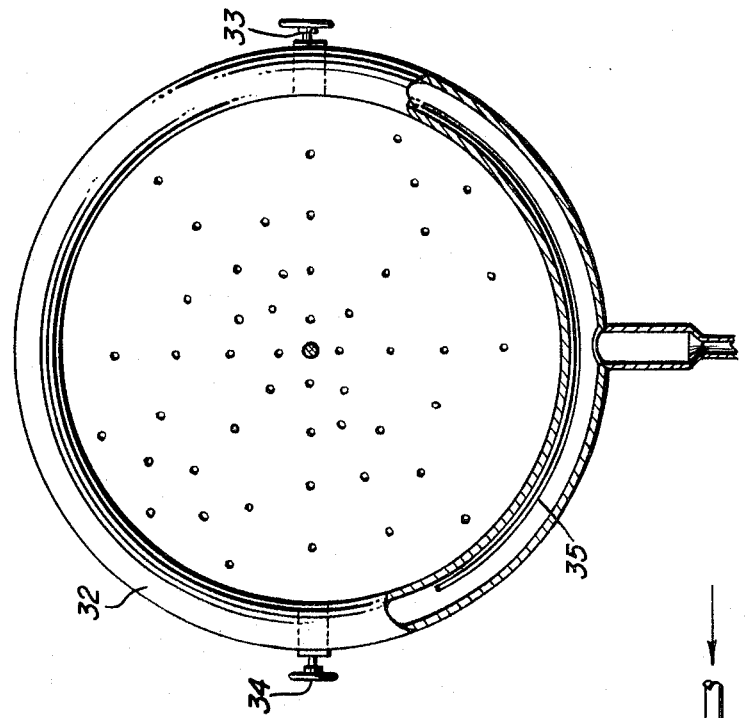
FIGS. 3 and 4 are views of arrangements of secondary air nozzles.

FIG. 1 illustrates the gaseous pressure shearing device in combination with an extruder. 11 is an extruder body, 13 the rotating extruder screw and shaft and 12 the viscous material which is to be extruded through the die plate 15. Set pins 14 guide and clean the screw 13. The die plate 15 has multiple holes of a set shape and dimension so as to shape the viscous material 12. These holes are usually circular so as to produce cylindrical shaped extrudates. The diameters of these holes may very effectively range from 1/32 inch to ¼ inch. Generally, the end use of the desired product will determine the diameter of the extrusions to be produced.

An extruder collection box is provided at 16, this box being removably mounted to the extruder. This collection box is below the plane of the shearing device and receives the extrusions as they are sheared from the die face. A mounting support 17 is utilized to attach the shearing device to the extruder. This mounting support may be attached to the extruder body or the die plate. This mounting support is attached via a bracket collar 18 to a gas manifold 19. This attachment of the mounting support to the gas manifold is preferably a movable mounting. This gas manifold has a gas inlet 20 via conduit 21. The gas manifold also comprises the support for the gas nozzle 22 and the conical deflector 23. In a preferred embodiment, a guy rod 24 passes into a centering aperture 25 in die plate 15 to position and support conical deflector 23. Conical deflector 23 is movably mounted on this guy rod so that the distance of the conical deflector from the die plate can be varied. The conical deflector can be adjusted via cone slide rod 26. The distance of the conical deflector, and in turn the die plate face, can be adjusted via the movable mounting of the gas manifold 21 to the mounting bracket collar 18. By this arrangement, each essential piece of the device can be adjusted.

FIG. 2 illustrates more completely the adjustable characteristics of the shearing device. As is evident, the curvature A of the deflector cone can be varied, as can the distance B of the deflector cone to the die face, the distance C of the nozzle to the cone, and the distance D of the nozzle to the die face. As is apparent, the cone curvature is set when the cone is constructed. The distance is easily adjusted by slideably adjusting the manifold 21 within the collar 18. A set screw can be used to secure the adjustment. B and C can be adjusted solely by an adjustment of the cone slide rod 26, or by a co-adjustment of both the gas manifold 21 within collar 18 and cone slide rod 26. The exact adjustments will depend on the particular extrudates, extrusion velocity and the dimension and shape of the extrudates. These adjustments will determine the length of the extrusions. Extrusion lengths are usually maintained in a range of from 1/8 inch to 1 inch.

Figure 3:
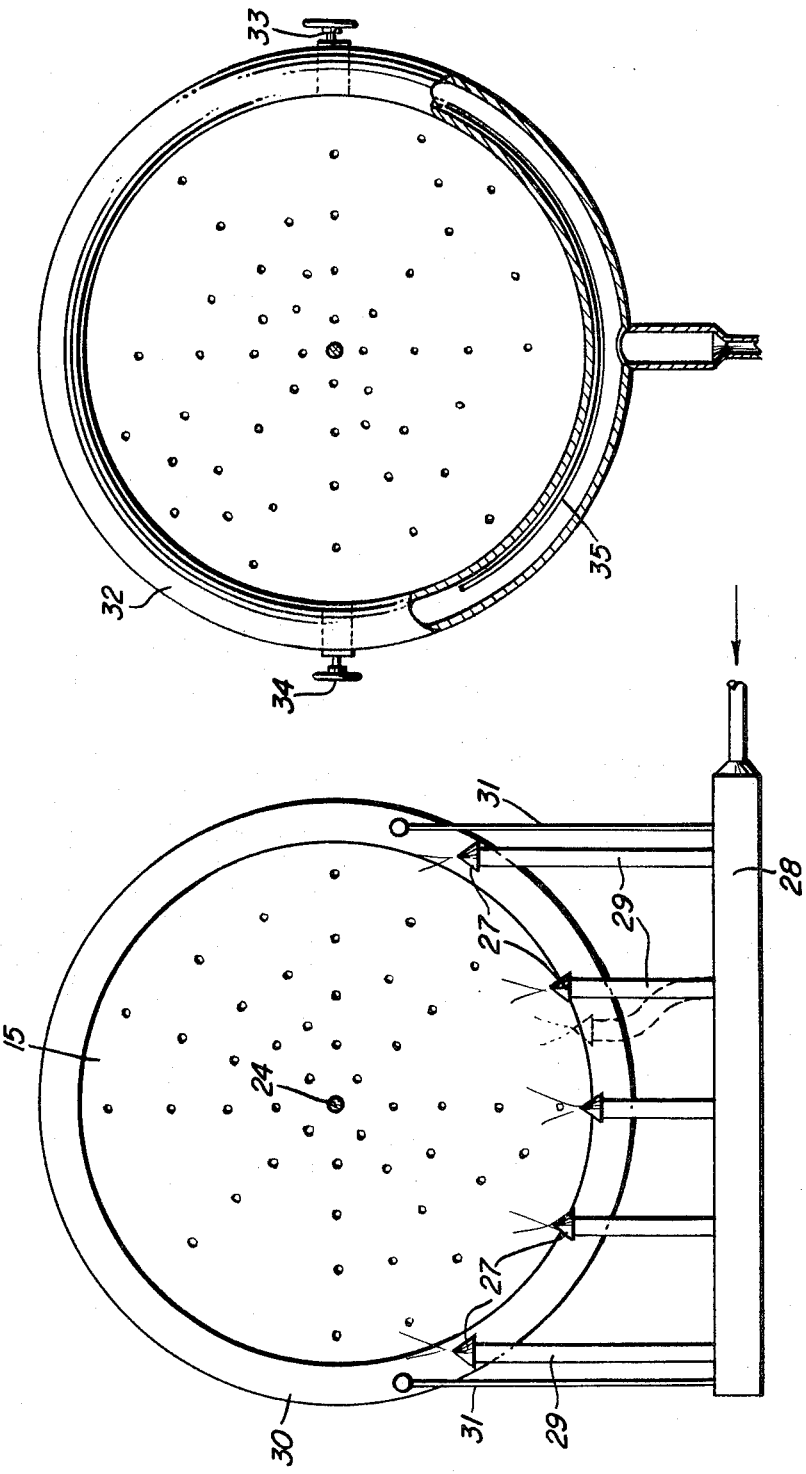

FIG. 3 illustrates the optional embodiment of a secondary shearing gas stream essentially opposite in flow to that produced by the deflection of air off of the deflecting cone 23. This secondary shearing gas stream may consist of one or more individual nozzles 27 interconnected to gas manifold 21 or to a secondary gas manifold 28. These nozzles are interconnected to the gas manifold, preferebly by flexible conduits 29. The securing means of the nozzles to the periphery of the die face is preferably by a way that allows the nozzles to be 3-dimensionally adjustable. That is the nozzles can be adjusted to any orientation in the standard x-y-z planes. This versitility gives greater control over the extrusions produced. The nozzles are mounted on ring 30 which is attached to the extruder. The secondary gas manifold may also be attached to ring 30 as by supports 31. FIG. 4 illustrates a peripheral halo nozzle 32 which will provide an inward air flow from the full periphery or part of the periphery of the die. Valves 33 and 34 restrict the gas flow in this nozzle. The opening 35 may be a series of small holes or a continuous slit. In either embodiment, a curtain of gas is produced. This nozzle is movably adjustable so that the distance of the air curtain from the die face can be changed. This is readily accomplished via the mounting means of nozzle 32 to the extruder. The purpose of the optional secondary nozzles is to provide a greater cutting force when the extrudates have a large diameter. Generally, if the L/D ratio is less than about 3, a secondary arrangement should be used.

Essentially any gas which is inert in regard to the material being extruded can be used, with air being the usual choice. The pressure of the shearing gas is usually in the range of 25 to 300 psi, depending on the consistency of the material being extruded and the diameter of the extrusions. Thusfar, however, it has been found that pressures of 50 to 150 psi are very adequate.

This shearing device is particularly useful for shearing extrudates of silicas, silica gels, aluminas, alumina gels, amorphous and crystalline aluminosilicates, titanias, magnesias, zirconias, beryllias, vanadias, clays and mixtures of these and similar metal oxides. The device is particularly useful for shearing extrudates of silica gels and crystalline aluminosilicates which are also known as zeolites. These zeolites may be synthetic or naturally occurring. Illustrative of the synthetic zeolites are the commercially produced zeolites designated Zeolite A, Zeolite X, Zeolite L and Zeolite Y by the Linde Division of the Union Carbide Corporation. Illustrative of naturally occurring zeolites are erionite, faujasite, chavazite, mordenite, huelandite, clinoptilolite and ferriorite. Also, there may be extruded and cut mixtures of oxides such as silicaaluminas, silica-titanias, and mixtures of amorphous and crystalline aluminosilicates. And in a further embodiment, these oxides or oxide mixtures may be impregnated with various ions, ion mixtures or compounds. When crystalline zeolites are to be formed into extrusions, they will in many instances have had the alkali ions exchanged with alkaline earth, transition metal or rare earth ions. And silicas, aluminas and titanias will in many instances when to be subsequently used as a catalyst, be impregnated with metal ions such as platinum, palladium, cobalt, molybdenum, nickel, iron, vanadium, copper, zinc, manganese, antimony, bismuth, phosphorous as well as others. Further, the extrusions may contain lubricants, preservatives, fillers, binders or other additives. In essence, therefore, the shearing device of this invention will operably shear any oxide extrusions or mixtures, with or without additives.

In one mode of the actual practice of this invention, a cobalt molybdate impregnated alumina is fed into a 4 inch Bonnot extruder. The alumina contains 20 percent combined metals, and has a 60 percent T.V. at 1,750° F. This volatile content is water and ammonium. The die is a 1/2 inch thick stainless steel plate with 1/16 inch die holes. Air is fed to the gas manifold at 60 psi. The deflector cone is set at the die face and the extruder operates at 9.5 amperes. As the extrusions reach a length of about 1/8 inch (L/D – 2) they are sheared and fall into the hopper. At the completion of the run, the extrusions are dried and tested for attrition resistance and catalytic activity. Both properties exceed those of extrusions sheared by wire cutting devices.

In another mode of practicing this invention, an I.D. silica hydrogel having an effective pore volume of 1.25 cc/g and a TV at 1,750° F of 76 percent is fed into a 4 inch Bonnot extruder. The die is a 1/2 inch thick stainless steel plate with 1/8 inch die holes. Air is fed to the gas manifold at 80 psi. The deflector cone is set at the die face and the extruder operated at 8.0 amperes. As the extrusions reach a length of about one-eighth inch (L/C = 2) they are sheared and fall into the hopper. At the completion of the run, the extrusions are dried at 250° C in a tray drier. These extrusions were then coated with phosphoric acid ($H_3PO_4$) to loadings of 40–50 percent phosphoric acid by weight and charged into a reactor. These extrusions proved to be very effective catalysts for the hydration of ethylene to ethanol.

In yet another mode of practicing this invention, a composition having the formulation

| | |
|---|---|
| Zeolite X Molecular Sieve | 80 parts |
| Avery Clay | 20 parts |
| Methocel | 5 parts |
| Water | 39 parts | is fed to a 4 inch Bonnot extruder 1/2 inch thick stainless steel die with 1/16 inch die holes. Air is fed to the gas manifold at 80 psi. The deflector cone is set one-fourth from the die face and the extruder operated at 10.5 amperes. As the extrusions reach a length of one-fourth inch (L/D = 4) they are sheared and fall into the hopper. At the completion of the run, the extrusions are dried and activated.

And in yet another mode of use of the present invention, a zeolite 3A aqueous wet mix slurry containing 3 percent Sterotex (lubricant) is fed to a 4 inch Bonnot extruder. The extruder is fitted with a 1/2 inch thick stainless steel die having 1/8 inch die holes. The extruder is operated at 8.0 amperes. Air is fed to both the primary and secondary manifolds at 50 psi. The secondary manifold sprays currents of air upwardly from four distinct nozzles. The deflector cone is set at one-eighth inch from the die face. The extrusions are sheared at the die face when they reach a length of 3/8 to 1/2 inch. After shearing they fall into a hopper. These extrusions are then dried and activated. These extrusions are very useful in drying gaseous feed streams.

These modes of use of the present device are set out to illustrate the present invention, and should not be considered as exhaustively disclosing the contempleted uses. These are, however, some of the preferred modes of use of the present invention.

What is claimed is:

1. A device for cutting extrusions comprising a cutting device mounted adjacent the die surface of an extruder, said cutting device comprising:
    a high pressure gas manifold;
    an input means for inserting high pressure gas into said gas manifold;
    a nozzle on one end of said gas manifold, said nozzle communicating with a high pressure zone and a zone of essentially atmospheric pressure; and
    a gas deflector movably supported by said gas manifold and positioned in a transition zone between said high pressure zone and said essentially atmospheric pressure zone, whereby a high pressure gas from said nozzle is deflectively shaped and cuts said extrusions at said die surface.

2. An extrusion cutting device as in claim 1 wherein said gas deflector is adjustable to a distance from said nozzle.

3. An extrusion cutting device as in claim 1 wherein said cutting device is removably mounted to said extruder.

4. An extrusion cutting device as in claim 2 wherein a support means interconnects said gas manifold and said extruder whereby said nozzle and said deflector are in a close relationship to the die of said extruder.

5. An extrusion cutting device as in claim 4 wherein said nozzle is movably adjustable with reference to said die, and said gas deflector is movably adjustable with reference to said die.

6. An extrusion cutting device as in claim 5 wherein at least one secondary nozzle is positioned at the periphery of said die.

7. An extrusion cutting device as in claim 6 wherein a plurality of secondary nozzles are positioned at the periphery of said die.

8. An extrusion cutting device as in claim 6 wherein said secondary nozzle surrounds the full periphery of said die.

9. An extrusion cutting device as in claim 6 wherein said secondary nozzle is maintained in position by said support means.

10. An extrusion cutting device as in claim 6 wherein the said high pressure gas is air.

* * * * *